United States Patent [19]
Paterson et al.

[11] Patent Number: 5,794,163
[45] Date of Patent: Aug. 11, 1998

[54] HEADSET FOR HANDS-FREE WIRELESS TELEPHONE

[75] Inventors: Graeme S. Paterson, Boulder; Gary L. Bliss, Westminster; Mark R. Boyd, Boulder, all of Colo.

[73] Assignee: SpectraLink Corporation, Boulder, Colo.

[21] Appl. No.: 482,895

[22] Filed: Jun. 7, 1995

Related U.S. Application Data

[62] Division of Ser. No. 97,881, Jul. 27, 1993, Pat. No. 5,557,653.

[51] Int. Cl.$^6$ .................................................. H04Q 7/32
[52] U.S. Cl. .......................... 455/568; 379/430; 455/569
[58] Field of Search .................. 379/58, 59, 61, 379/63, 430; 455/89, 90, 568, 569, 550, 403, 567

[56] References Cited

U.S. PATENT DOCUMENTS

| | | | |
|---|---|---|---|
| 4,433,209 | 2/1984 | Kurusawa et al. | 381/1 |
| 4,449,017 | 5/1984 | Burke et al. | 179/27 D |
| 4,558,178 | 12/1985 | Yasuda et al. | 179/2 |
| 4,562,310 | 12/1985 | Watters et al. | 179/100 R |
| 5,488,657 | 1/1996 | Lynn et al. | 379/395 |
| 5,504,812 | 4/1996 | Vangarde | 379/430 |
| 5,606,607 | 2/1997 | Yamaguchi et al. | 379/430 |

*Primary Examiner*—Dwayne Bost
*Assistant Examiner*—William G. Trost
*Attorney, Agent, or Firm*—Dorr, Carson, Sloan & Birney, P.C.

[57] ABSTRACT

A wireless telephone using an RF receiver unit and an RF transmitter unit and having a removable headset, the telephone and headset particularly suitable for applications where the RF transmitter unit is switched on and off at a frequency less than twenty kilohertz. The wireless telephone is coupled to the headset using a conventional stereo plug and jack. A headset detect logic signal is generated from the speaker audio line. A microphone current detect logic signal is generated from the microphone audio line. A digital logic circuit, preferably including a microprocessor, monitors the headset detect logic signal and microphone current detect logic signals and generates a programmed response to the headset detect logic signal. The programmed response reduces audible noise to the headset user, generates a ringing signal on the speaker audio line when an incoming call is received and allows the headset user to answer incoming calls, and place outgoing calls while touching only the headset. The wireless telephone and headset include circuitry to reject RF noise and circuitry to attenuate RF noise passed into the wireless telephone by a long multi-conductor wire coupling the headset to the wireless telephone.

9 Claims, 3 Drawing Sheets

HEADSET FOR HANDS-FREE WIRELESS TELEPHONE

This application is a divisional of application Ser. No. 08/097,881 filed Jul. 27, 1993, now U.S. Pat. No. 5,557,653.

BACKGROUND OF THE ART

1. Field of the Invention

The present invention relates to portable wireless telephones and, more particularly, to a portable telephone having a headset allowing hands-free operation of the portable telephone in a time division duplex (TDD) or time division multiple access (TDMA) communication system.

2. Statement of the Problem

While many audio devices such as stereos, tape players and televisions can use headsets, most headsets are not used near any transmitted radio frequency (RF) fields. For example, headsets are sometimes used by telephone operators or receptionists but they are only near a conventional telephone, not an RF transmitter. Police radios, aircraft radios, and similar communication equipment use headsets near RF fields, but operate in a simplex mode (push to talk, release to listen) so that the receiver circuits are only active when the transmitter is inactive. In a home cordless phone or cellular phone, the transmitter and receiver are on continuously, but the transmitter and receiver operate at different frequencies. This is called a frequency division duplex (FDD) system. In an FDD system the RF field is not switched on and off during communication and there is little possibility of audible noise being received by the headset.

Radio telephones using TDD/TDMA are becoming increasingly popular. In TDD/TDMA, the transmitted RF field is turned on and off at some rate, for example one hundred times per second. When the RF field is switched at less than about 20 KHz, the switching is at an audible rate. When a conventional headset is connected to the TDD/TDMA transceiver, the long wire connecting a headset to the phone acts as an antenna injecting stray RF energy into both the phone and headset circuits. The stray RF energy is typically rectified by a semiconductor device in the phone or headset creating a DC voltage that pulses at the TDD/TDMA rate. This in turn creates a highly objectionable audible pulsing which is heard by the headset user and transmitted back to other telephones in the communication system.

In existing headset systems it is common that loudspeakers that would otherwise be used to produce an audible signal are mechanically disconnected from the electrical audio signal when the headset plug is inserted into the jack. In other words, when the headset plug is inserted into the jack, the electrical connection between the audio signal and the loudspeaker is mechanically broken and the electrical audio signal is diverted to the headset. This mechanical breaking effectively disables the loudspeaker but does not provide any logic indication that the headset is present. Because of this, devices that use digital control logic cannot adjust their performance based on the presence of the headset. Particularly in wireless telephone applications it is desirable to change the form and/or volume of the ringing signal when the headset is in use. Most often, performance adjustment can only be achieved by the user pressing one or more buttons on the wireless telephone to adjust features such as volume to a comfortable level for the headset. This is not only inconvenient, but detracts from a major purpose of a headset which is to leave the user's hands free for other work.

Another problem with prior headset systems arises because the audible signal is injected directly into the user's ear, any stray noise can cause discomfort and even ear damage if left uncontrolled. As mentioned before, headsets used in RF environments are particularly susceptible to this stray noise. In wireless telephone applications it is important to conserve battery power by placing the phone in a "standby" or "sleep" mode between calls in which power supplies are poorly regulated and noisy as a result of conserving battery power. This standby power supply noise can be audible and objectionable. A headset for wireless telephones is needed that can reduce stray noise in the headset during standby mode.

A headset is typically provided with a multi-conductor wire coupled to the speaker and microphone elements in the headset. The multi-conductor wire terminates in a plug having the same number of conductors as the wire. The plug is inserted into a jack that is built into a telephone, for example. Alternatively, the jack may be provided in a separate headset interface device. The headset can be given greater functionality by providing more conductors in the jack plug and wire. For example, in a wireless telephone it is desirable that enough conductors exist in the wire, plug and jack to carry signals from the headset microphone, to the headset earpiece and to allow the user to take the phone on and off hook to answer and terminate calls. This functionality comes at great cost and bulk, however, because custom jacks and plugs must be designed if many conductors are used. A headset system that provides a high level of functionality with few conductors in the jack, plug and multi-conductor wire is needed.

3. Solution to the Problem

The above mentioned problems and others are solved by a headset system particularly adapted for wireless telephones operating in a TDD/TDMA environment using filtering circuits in both the wireless telephone and the headset to decrease the quantity of noise injected into the headset and to attenuate any noise that is injected to acceptable levels.

An audio speaker line is coupled through a resistor to a logic level voltage supply to generate a logic level signal indicating that the headset is plugged in. The logic level signal is generated on the audio speaker line, so no additional conductors are required between the wireless telephone and the headset to generate this logic level "headset detect" signal. This headset detect signal is then used by digital control logic to enable or disable the headset and internal speakers to provide features unique to the headset user and to eliminate excessive noise to the headset user.

A microphone current detect circuit is coupled to the microphone audio line in the wireless telephone to provide a logic level "microphone detect" signal indicating when current is flowing in the microphone. The headset is modified by placing a switch in the microphone audio line to stop current flow in the microphone when the switch is open. The control circuitry interprets the microphone detect signal as an on/off hook indicator, thereby allowing the user to answer a call without touching the wireless telephone. Also, by using the microphone audio line for this logic signal, additional functionality is achieved without additional conductors between the wireless telephone and the headset.

SUMMARY OF THE INVENTION

Briefly stated, the present invention provides a wireless telephone having an RF receiver unit for receiving digitized voice information transmitted at a radio frequency and converting the received digitized voice information into a received audio signal on a speaker audio line. The wireless telephone also has an RF transmitter unit for converting a transmit audio signal of a users voice on a microphone audio line into digitized voice information and transmitting the digitized voice information at the radio frequency and is particularly suitable for applications where the RF transmitter unit is switched on and off at a frequency less than twenty kilohertz.

The wireless telephone includes a headset jack for receiving a headset plug, the headset jack having a ground conductor, a pair of movable conductors, and a pair of stationary conductors configured so that the movable conductors are electrically isolated from the stationary conductors when a headset is plugged into the headset jack and the movable conductors are electrically coupled to the stationary conductors when the headset is removed from the headset jack.

A headset detect logic signal is generated from the speaker audio line by a circuit coupled to the stationary conductor. A digital logic circuit, preferably including a microprocessor, monitors the headset detect logic signal and generates a programmed response to the headset detect logic signal.

In another aspect of the present invention, a microphone is used to generate an audio signal on a microphone output and a manual switch is coupled in series between the microphone output and the microphone audio line. A bias circuit coupled to the microphone audio line provides a DC bias current to the microphone. A microphone current detect logic signal is generated by a circuit having an input coupled to the microphone audio line and a binary output. The binary output is coupled to the digital logic circuit which preferably uses the binary output to cause a ringing signal on the speaker audio line when an incoming call is received, answer incoming calls, and place outgoing calls.

In yet another aspect of the present invention, the wireless telephone and headset include circuitry to reject RF noise and circuitry to attenuate RF noise passed into the wireless telephone by a long multi-conductor wire coupling the headset to the wireless telephone.

DETAILED SPECIFICATION

1. Overview

Figure 1:
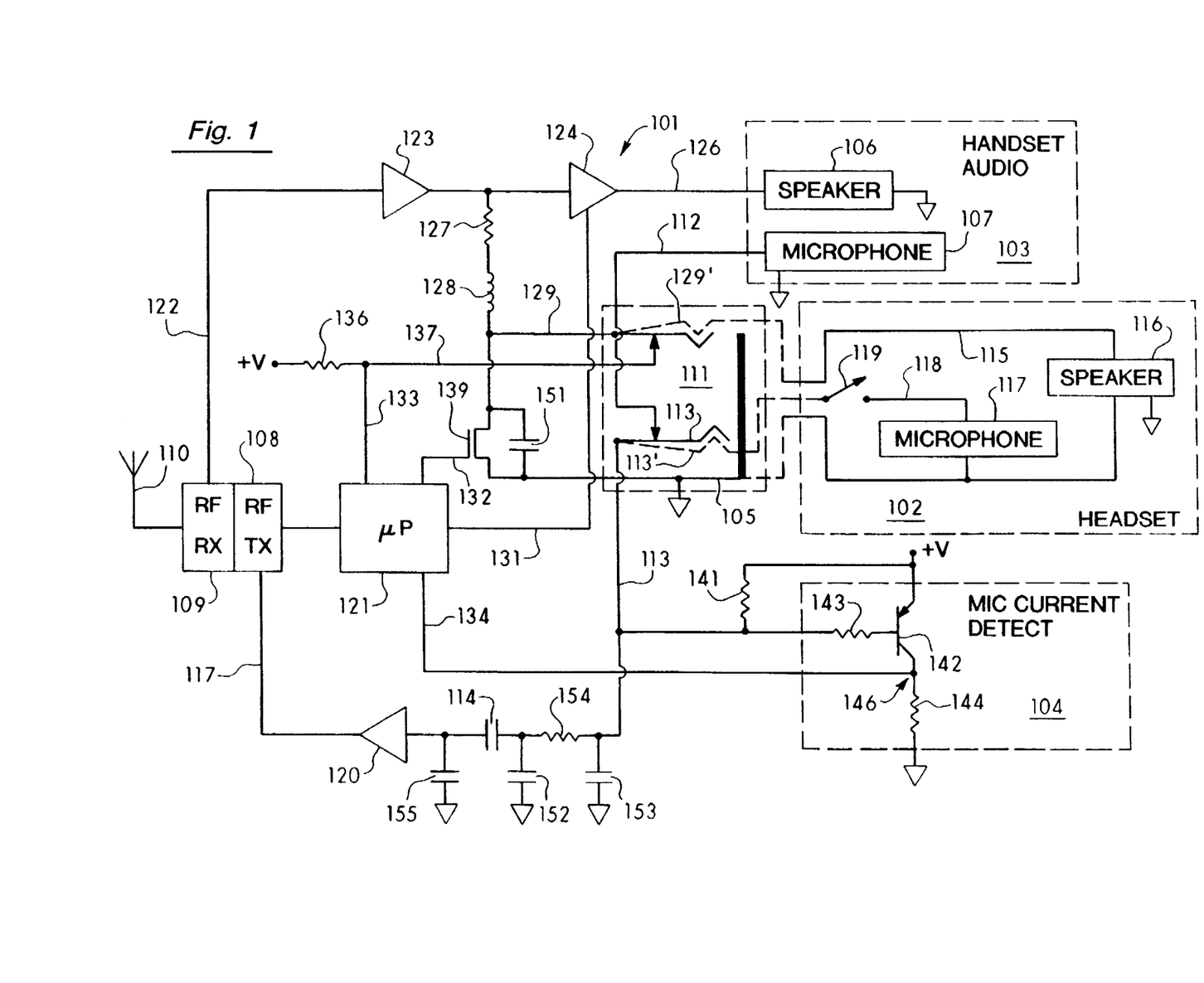
FIG. 1 illustrates a portable wireless telephone circuit having a headset in accordance with the present invention.

FIG. 1 illustrates a block diagram schematic of a wireless phone 101 having a headset 102 in accordance with the present invention. In the preferred embodiment all elements of FIG. 1 except for headset 102 are provided integrally in a single portable telephone unit that is shaped like a handset of a conventional radio telephone. The wireless phone 101 operates using time division duplex (TDD) or time division multiple access (TDMA) data format in which it receives and transmits voice data on the same frequency using frequency modulated digital information. Both received and transmitted digital information are divided into time frames which are further divided into time slots.

Each time slot contains both the digital voice information and various signalling information used to synchronize the circuitry in wireless phone 101. In practice, some time frames are allocated exclusively to received information and some are allocated exclusively to transmitted information allowing wireless phone 101 to transmit and receive apparently simultaneously on the same frequency. However, to accomplish this wireless telephone 101 must switch the RF transmitter (RF TX) 108 rapidly, about one hundred times per second in the preferred embodiment, to receive data during the time frames allocated to receiving data.

In accordance with the present invention, wireless telephone 101 is provided with a headset jack 111. Preferably, headset jack 111 is a conventional three wire stereo headset jack. While cable connectors are available with more than three wires, these are much more expensive than three wire stereo jacks because of widespread use of stereo jacks in audio applications. Moreover, a stereo jack 111 together with a stereo plug (not shown) on the end of headset 102 provides the user with a convenient, compact, and familiar way to couple headset 102 to wireless telephone 101.

Headset jack 111 includes a ground line 105, first movable conductor 113, second movable conductor 129, and stationary conductors indicated by lines 112 and 137. As suggested by dashed lines 113' and 129', when the headset plug (not shown) is inserted into headset jack 111, movable conductors 113 and 129 are pushed out of contact with stationary lines 137 and 112, and into positions 113' and 129'. The headset plug which inserts into headset jack 111 is not illustrated in the schematic of FIG. 1 for ease of illustration and understanding, but it should be understood that any conventional plug adapted and designed to mate with and make electrical contact to conductors in headset jack 111 is suitable. Conductor 113' makes electrical contact to headset microphone line 118 through switch 119 in headset 102. Conductor 129' makes electrical contact through the headset plug to line 115 in headset 102. Headset 102 also makes electrical connection to ground line 105.

During a telephone conversation, voice audio is converted to a weak electrical signal in either microphone 107 in the handset audio 103 or by microphone 117 in headset 102. A DC current is applied continuously to microphone 107 or microphone 117 when it is connected, and sound pressure causes small AC fluctuations in the DC voltage drop across microphone 107 or 117 when voice audio is applied. This AC signal, hereinafter referred to as the microphone audio signal, passes through headset jack 111 on line 112 or on line 118 in headset 102, where either the signal from microphone 107 or the signal from microphone 117 is selected, as described in greater detail below.

The selected microphone audio signal passes on line 113 through capacitor 114 which passes the microphone audio signal and rejects the underlying DC voltage. The microphone audio signal is then amplified by microphone amplifier 120 and passed on line 117 to RF transmitter unit 108. RF transmitter (RF TX) 108 cooperates with microprocessor 121 to convert the AC voice audio signal into a TDD/TDMA digital signal which is transmitted over antenna 110.

During a receive data time frame, antenna 110 provides an RF signal on RF receiver (RF RX) unit 109. RF RX unit 109 cooperates with microprocessor 121 to convert the received RF signal from TDD/TDMA format to an AC audio voice signal, hereinafter referred to as the speaker audio signal. RF RX unit 109 delivers the speaker audio signal on line 122 to amplifier 123. If no headset is present, the output of amplifier 123 is applied to driver 124 which drives handset speaker 106, which is built into wireless telephone 101, on line 126.

When headset 102 is present, the received audio voice signal passes from amplifier 123 through resistor 127, inductor 128, to line 129. Line 129 is placed in position 129' when headset 102 is plugged into jack 111 and couples the speaker audio signal through line 115 in headset 102 to headset speaker 116.

In summary, the speaker audio signal is amplified and directed either to a speaker in the handset audio portion 103 of wireless telephone 101 or to a headset speaker 116 in the headset 102. A microphone audio signal generated by microphone 107 or microphone 117 is selectively coupled to a microphone amplifier 120, converted to digital format and transmitted by RF TX unit 108.

Although the preferred embodiment uses conventional TDD or TDMA format, it should be understood that anytime a headset is required to operate near strong transmitted RF fields, various features of the present invention will be useful. It should be also understood that a wireless telephone 101 might be provided with no internal speaker 106 and microphone 107 such as found in handset audio portion 103 in which case audio signals would be generated and received entirely by headset 102. Such a "headset only" system would find useful many of the features of the present invention. The circuit elements shown in FIG. 1 and not yet described will be described in great detail below with respect to particular features of the present invention.

2. Headset Detect Logic Signal and Ringing Control

Volume of the received and transmitted voice audio signals and volume of the ringing tone used to signal an incoming call must be adjusted when headset 102 is connected. It is particularly important to adjust the audio level applied to speaker 116 since volume levels normally used for speaker 106 are preferably reduced for the headset 102 user. Also, in a preferred embodiment, the ringing signal is sent to either speaker 106 in handset audio 103 or speaker 116 in the headset 102. This feature allows use of a single speaker for both voice and ringing. However, the ringing signal must be quite intense when sent to handset audio speaker 106 because the user must hear the ringing when wireless telephone 101 is several feet away or across the room from the user. In contrast, when headset 102 is used, speaker 116 is extremely close to the user's ear and an intense ringing signal normally sent to speaker 106 would be uncomfortable and possibly cause ear damage. Hence, it is important that microprocessor 121 can detect when headset 102 is present and adjust performance of wireless telephone 101 accordingly.

In accordance with the present invention, line 129, which is an audio signal line used to carry the speaker audio signal to speaker 116, is also modified to generate a logic signal indicating presence of headset 102. This logic signal is called "headset detect" hereinafter. When headset 102 is not present, line 129 is electrically coupled to line 137 in jack 111. Line 137 is coupled by line 133 to microprocessor 121 and to a +V power supply through resistor 136. When headset 102 is disconnected, a current path is thus created from the +V power supply through resistor 136 and line 137 to line 129. Disregarding for the moment the effect of transistor 139, the current path continues through coil 128, resistor 127, and through the output impedance of amplifier 123 to ground.

This current path is interrupted when headset 102 is connected as indicated by dashed line 129' in headset jack 111. When headset 102 is disconnected, the current path results in a voltage drop across resistor 136 that is sufficient to generate a logic "LOW" signal on line 133 which can be used by microprocessor 121 to indicate that headset 102 is disconnected. Likewise, when the current path is interrupted by the insertion of headset 102, there is no voltage drop across resistor 136 and line 133 rises to a logic "HIGH" level. Microprocessor 121 interprets the logic "HIGH" as indicating the presence of headset 102 and adjusts performance of wireless telephone 101 accordingly.

An important advantage of the present invention is that the headset detect logic signal is derived from a signal on audio signal line 129. Conventionally, audio signal lines are not used for logic signals because large variations in the audio signal can be misinterpreted as changes in logic state. For this reason, the audio voltage of the output of amplifier 123 must be low enough in amplitude as to not cause the logic sensing the state of the headset detect line 133 to misinterpret the audio positive peak as a headset plug insertion. When the audio has a negative peak, resistor 127 limits current drawn from the logic connected to the headset detect line 133. When microprocessor 121 detects the presence of a headset, it disables speaker driver amplifier 124 by a signal on line 131.

Microprocessor 121 also uses the headset detect signal on line 133 to control a headset disable signal on line 132. The headset disable signal on line 132 turns on transistor 139 thereby shorting any audio signal on line 129 to ground. This provides an alternative current path for the headset detect signal from the +V power supply through resistor 136, line 137, to line 129 which is held to ground through transistor 139. This feature prevents audio noise from appearing on line 129 until after microprocessor 121 detects the presence of a headset. Hence, speaker 116 in headset 102 can be disabled by transistor 139 even though it is plugged in until microprocessor 121 detects a need to activate headset 102. Such a need arises, for example, when microprocessor 121 sends ringing to speaker 116 to signal an incoming call. This feature prevents loud noise that can occur during the standby or sleep mode when internal power supplies are poorly regulated. This feature also prevents popping and cracking that can occur in headset speaker 116 when the headset plug is inserted into the headset jack 111. Both of these attributes greatly increase the comfort and usability of headset 102.

The preferred embodiment is described in terms of a circuit for generating a positive logic signal (i.e. a logic HIGH is a positive voltage, logic LOW is a ground voltage) although other logic signals are known and may be derived from the speaker audio line. Also, the preferred embodiment uses the speaker audio line to develop the headset detect signal. However, the headset detect signal can be derived from microphone audio line 113 in some applications using circuitry similar to that disclosed. Functions in addition to speaker disable and headset enable may be provided in response to the headset detect logic signal with appropriate control circuitry. These and other modifications are within the spirit and scope of the present invention.

3. Headset Microphone Current Detect Logic Signal

A useful quality of the present invention is it gives the headset user an ability to answer and terminate phone calls using a simple switch in headset 102. This feature is provided by a circuit that generates a logic signal indicating when the headset is "on hook" (not in use) or "off hook" (in use). To minimize the number of conductors passing between headset 102 and wireless telephone 101, it is important that the on/off hook capability be incorporated in an audio signal line. In accordance with the present invention, a switch 119 is placed in the microphone audio line 118 of microphone 117. Switch 119 is coupled through a headset plug (not shown) to headset jack line 113' when the headset is coupled to wireless telephone 101.

Headset jack conductor 113' forms the microphone audio line 113 as described above. Microphone 117 and microphone 107 are normally biased with the DC voltage supplied by a +V power supply applied through resistor 141 which is coupled to microphone audio line 113. In accordance with the present invention, microphone audio line 113 is also coupled to microphone current detect circuit 104 used for generating a logic signal indicating when switch 119 is open or closed. The microphone audio signal is coupled from microphone audio line 113 through base resistor 143 of transistor 142. Transistor 142 is a PNP bipolar transistor in the preferred embodiment. When switch 119 in headset 102 is closed, microphone current flows through line 118 and microphone 117 to ground. This causes a voltage drop across resistor 141 sufficient to turn on transistor 142. When transistor 142 is on, node 146 is pulled near the +V voltage supply creating a logic high signal on node 146 across resistor 144.

When switch 119 in headset 102 is open, however, no current flows in microphone audio line 113 when headset 102 is connected. Because no current flows in microphone audio line 113, or resistor 141, transistor 142 is turned off. When transistor 142 is turned off, the voltage on node 146 is a logic low as no voltage is dropped across resistor 144. This "microphone detect" logic signal on node 146 is coupled to microprocessor 121 on line 134.

Microprocessor 121 monitors the microphone detect logic signal on line 134 to determine whether the user of headset 102 desires to be on hook or off hook. For example, if during an ongoing conversation, microprocessor 121 detects a logic LOW on line 134, it indicates that user of headset 102 has gone on hook and microprocessor 121 takes action to terminate the telephone call. Similarly, if no conversation is ongoing and microprocessor 121 detects a logic HIGH on line 134 indicating that the user has gone off hook, microprocessor 121 initiates action to establish a connection with another telephone. It is important to note that all of this increased functionality is provided without additional conductors passing between telephone 101 and headset 102 by deriving a logic signal from an audio signal line.

When headset 102 is in use, wireless phone 101 will often be fastened to a users belt for hands-free use. For convenience, the user should not have to pull wireless phone 101 from the belt to answer an incoming call or to terminate a call. Switch 119 in line with microphone audio line 118 provides this function without adding extra conductors to the headset jack 111, thereby reducing size and cost. Although the preferred embodiment uses this signal to indicate on/off hook, it should be understood that other functions could be implemented. For example, microprocessor 121 could respond to the microphone detect logic signal by automatically dialing a predetermined number. Also, switch 119 could be configured as an electronic switch providing a series of pulses rather than a single logic state to provide a variety of functions such as volume control, dialing and the like without touching wireless telephone 101.

4. Headset Noise Suppression Circuitry

In addition to suppressing sleep noise using transistor 139, the present invention includes a variety of circuit elements in both wireless telephone 101 and in headset 102 to suppress noise caused by the TDD/TDMA RF environment. Any sufficiently strong RF signal that varies with time can cause interference. If the modulating frequency of the RF noise signal is in the audio frequency range (up to 20 kilohertz) the interference will be heard by the users. For example, the preferred system turns RF TX unit 108 on and off at a 100 Hz rate, creating audible noise. Also, a TDD/TDMA system may use frequency hopping techniques in which RF TX unit changes frequencies several times per second, which also causes noise.

Figure 2:
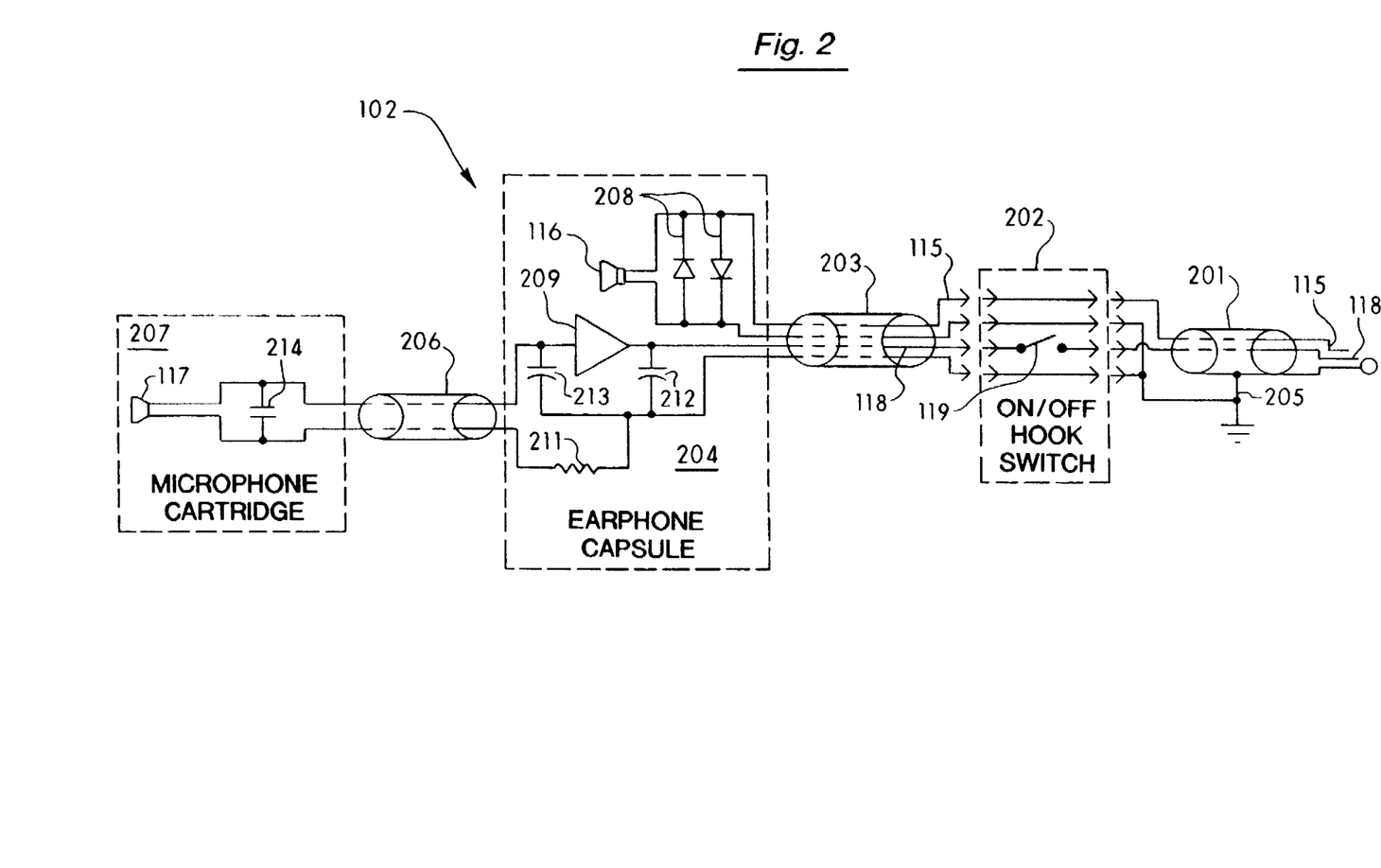
FIG. 2 illustrates in block diagram form details of the headset circuit shown in FIG. 1.

FIG. 2 shows a schematic diagram of headset 102 in greater detail. A typical headset includes an earphone capsule 204 held in place by a band over the users head or by a clip attached to the user's ear lobes. A small microphone cartridge 207 is placed in a pod at the end of a boom (not shown) that places the microphone near the user's mouth. Headset 102 includes a lower multi-conductor wire 201 that has one end terminating in a plug (not shown) that inserts into headset jack 111 shown in FIG. 1. Lower multi-conductor wire 201 couples to upper multi-conductor wire 203 through optional on/off hook switch 202. Upper multi-conductor wire 203 couples to circuitry in earphone capsule 204. Wires 206 extend through the boom (not shown) from earphone capsule 204 to the microphone cartridge 207.

Earphone capsule 204 includes amplifying circuitry 209 for amplifying the weak signal from microphone 117. Bias resistor 211 in earphone capsule 204 is coupled in series with microphone 117 to properly bias microphone 117 as is conventionally done in headset design. Earphone capsule 204 also houses headset speaker 116 and clamp diodes 208 coupled across speaker 116 to protect the users ears from loud received noise.

A unique problem created by using a headset with a wireless telephone is that the multi-conductor wire 201 in FIG. 2 coupling headset 102 to wireless phone 101 (FIG. 1) is extremely close to the transmitting antenna 110 (FIG. 1). Lower multi-conductor wire 201 acts as an antenna, sending RF noise to semiconductor junctions in microphone 117 and audio amplifiers 109 and 120 creating an audible buzzing or clicking in both the audio line 115 to speaker 116 and the audio line 118 from microphone 116.

Microphone cartridge 207 is a widely available component. In accordance with the present invention, capacitor 214 is placed directly across the leads of microphone 117 in microphone cartridge 207 to reduce noise reaching microphone 117. It is important that capacitor 214 be as physically close as possible to the leads of microphone 117, which often will require disassembly of a commercially available microphone cartridge and hand soldering of capacitor 214. Alternatively, capacitor 117 may be added during manufacture of microphone cartridge 207 by special ordering for high volume applications.

Noise reduction is further accomplished in accordance with the present invention by coupling capacitor 213 across the input to microphone amplifier 209 and capacitor 212 across the output of microphone amplifier 212. Capacitor 213 serves to shunt noise injected by boom wires 206 to ground while capacitor 212 prevents noise on the output of microphone amplifier 209 from being coupled through parasitic components of microphone amplifier 209 to the input of amplifier 209. Testing reveals that both capacitor 212 and 213 contribute to RF noise reduction. Unfortunately, because prior headsets did not require RF attenuation circuitry, it may be necessary to disassemble earphone capsule 204 to install capacitors 212 and 213.

Capacitors 212, 213 and 214 are preferably surface mount components and have a value selected to be large enough to provide low reactance at the operating frequency but small enough to provide adequate RF attenuation. In one system tested 270 picofarads was suitable when all capacitors were soldered directly across the pins of microphone 117 and microphone amplifier 209. Some variation in capacitor value should be expected if the physical distance between the capacitors and microphone 117 and microphone amplifier 209 is large.

An additional feature of headset 102 is that lower multi-conductor wire 201 is shielded by surrounding microphone audio line 118 and speaker audio line 115 with a conductive sheath coupled to ground as shown at 205. Shielding prevents RF signals from entering lower multi-conductor wire 201. Lower multi-conductor wire 201 is closest to transmitting antenna 110 (shown in FIG. 1) and so it is important that at least lower wire 201 is shielded. Optionally, upper multi-conductor wire 203 may be shielded also.

Returning now to FIG. 1, several components are added inside wireless telephone 101 to reduce noise in headset 102 in accordance with the present invention. Inductor 128 acts together with resistor 127 and capacitor 151 across transistor 139 to create a lossy low pass filter to reduce any RF energy that passes into or from amplifier 123. Capacitor 152, resistor 154, and capacitor 153 act together to attenuate RF energy passed onto line 113 from headset 102 before that energy reaches amplifier 120. A typical value for inductor 128 is 100 nanohenry and capacitors 151, 152 and 153 are typically 270 picofarad. It is recommended that inductor 128 have a non-ferrite core because a ferrite core can act as an antenna adding RF noise to the system.

Although the specific shielding and RF noise attenuation components set out above are chosen to work with a typical headset, some variation may be necessary in a particular application. In some instances resistors should be coupled in series with the signal lines at any of the capacitors 151, 152 or 153 in wireless telephone 101 shown in FIG. 1. Also, resistors should be placed in series with the signal lines at capacitors 212, 213 or 214 of headset 102 shown in FIG. 2 if capacitors alone do not provide sufficient RF attenuation. In extreme cases, series inductors should be used in addition to the series resistors. In all cases, the RF attenuation components should be selected to attenuate primarily at the operating frequency of wireless telephone 101. Also, upper multi-conductor wire 203 may be shielded to provide further RF noise rejection. These and similar modifications are within the scope and spirit of the present invention.

5. Operation of the Wireless Telephone with Headset

Figure 3:
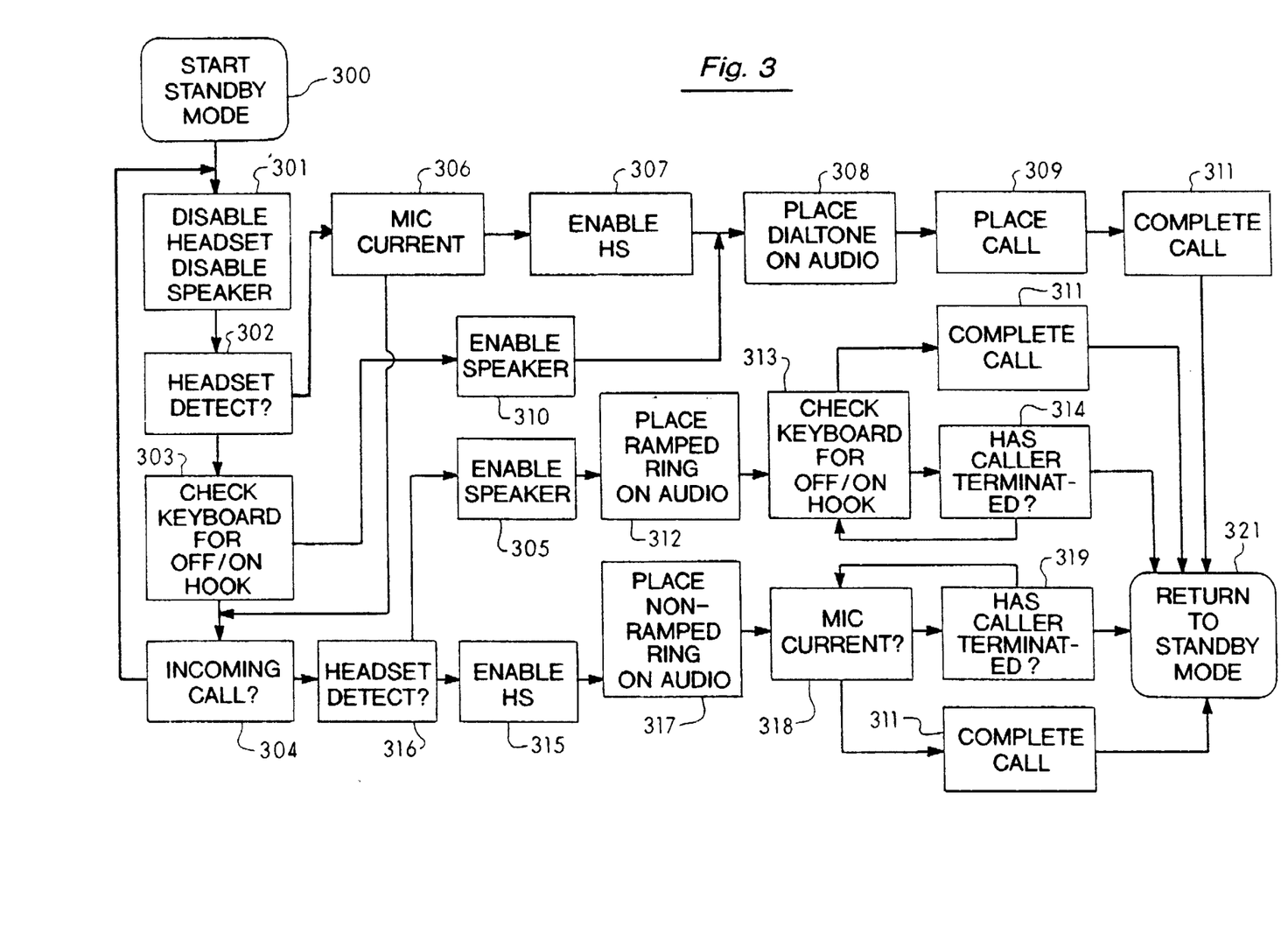
FIG. 3 shows a flow chart illustrating a method of using the portable wireless telephone and headset circuits shown in FIG. 1 and FIG. 2.

Operation of the present invention is illustrated in a simplified flow chart shown in FIG. 3. The flow chart in FIG. 3 is implemented in programming code controlling microprocessor 121 shown in FIG. 1. When wireless telephone 101 is turned on, it performs initialization routine to set the circuitry in a predetermined state, then enters a standby or sleep mode. In the standby mode wireless telephone 101 is not in use to either make or receive a call and cycles through four basic functions to monitor when to branch away from standby mode to perform a particular requested function. It should be understood that the flow chart shown in FIG. 3 is highly simplified and for clarity of illustration omits many routine functions that are performed.

In standby mode four basic functions shown in blocks 301–304 are repeatedly checked. The headset is disabled in operation 301 by applying a logic high on line 132 in FIG. 1. Also the handset speaker 106 is disabled in operation 301 by a logic signal on line 131. The headset detect line 133 in FIG. 1 is monitored during HEADSET DETECT? step 302 to determine if a headset has been inserted.

If no headset is present, the keyboard (not shown) is checked for an on/off hook indication during operation 303. A keyboard is conventionally supplied in wireless telephone 101 to indicate going off hook by pushing a designated button on the keyboard. Detecting an off hook signal when in standby mode indicates that the user wishes to place a call. If no keyboard indication exists in operation 303, the standby mode next checks for incoming calls by monitoring the RF RX unit 109 in FIG. 1 during operation 304. It should be understood that the order of steps 301–304 is for convenience only, and that they may be rearranged as desired to meet a particular need. After completing the check for incoming calls in operation 304, standby mode cycles back to the step 301.

When a headset is detected by a logic high signal on line 133 during step 302, the program branches out of standby mode and the microphone detect logic signal is monitored during step 306 on line 134 in FIG. 1. If no microphone current is detected, the headset is on hook (not in use) and the program flow returns to step 304 of the standby mode. When a microphone current is detected in step 306, the program enables the headset in ENABLE HS operation 307 by placing a logic low signal on line 132 in FIG. 1. It is important to note that the headset enable occurs only after the headset is detected and the microphone current is detected, so that when the headset is first plugged in during standby mode it is disabled. This feature prevents noise caused by the insertion of the plug into the jack from causing loud popping or crackling in headset speaker 116 (shown in FIG. 1).

A microphone current detected in step 306 indicates that the user has taken the phone off hook. At this stage no incoming call was detected at step 304, nor is an ongoing conversation taking place, so the microphone current detect logic signal in step 306 indicates that the user desires to place a call. Microprocessor 121 responds by placing a dial tone on the audio line through RF RX unit 109 in operation 308. Because microprocessor 121 has previously detected the presence of headset 102, it can modify the dial tone specifically for the headset user.

After the dial tone is provided, a call is placed in a conventional manner in step 309, and the program enters a complete call subroutine 311. In the complete call subroutine 311 the program will cycle through a number of functions used to maintain a high quality connection during the call. These functions include monitoring the headset detect line 133 and microphone current detect line 134 to determine if the headset is removed or placed on hook during the call. When an on hook signal is detected the program returns to standby mode in operation 321.

Similarly, a user can initiate a call through the keyboard (not shown) in wireless telephone 101 during standby operation 303. When this occurs, the program jumps from operation 303 to ENABLE SPEAKER operation 310 then to the PLACE DIAL TONE ON AUDIO operation 308, where the call is placed and completed in operations 309 and 311. The dial tone, place call, and complete call subroutines 308, 309 and 311 are all modified as to functions such as volume when headset 102 is detected on line 133.

When an incoming call is detected in operation 304, the headset detect logic signal on line 133 is used to make a branching decision indicated at step 316. When no headset is present, the handset speaker 106 (shown in FIG. 1) is enabled in operation 305 and a ramped ringing signal is placed on the speaker audio line 122 (shown in FIG. 1) during step 312 by microprocessor 121 through RF RX unit 109. A ramped ringing is one in which the volume of the ringing is gradually increased with each ring. Ramped ringing is appropriate when handset speaker 106 is in use because it is not known how far speaker 106 is away from the users ear. If it is close, the user will notice the initial quiet ringing. If wireless telephone 101 is far away from the user, for example across the room, the ringing will ramp up to a volume sufficient to be heard. However, when headset 102 is in use the ramped ringing has no purpose, and so a low volume non-ramped ringing or tone is placed on speaker audio line 122 (shown in FIG. 1) during step 317 to indicate an incoming call.

Continuing with the upper flow for an incoming call without a headset, the program monitors the keyboard at step 313 waiting for the user to push a button to answer the call. If the user does not answer, the program checks to see if the caller has terminated the call in step 314. This cycle is repeated until the user answers or the caller gives up. Optionally the microprocessor 121 can terminate the call automatically at a predetermined time or take some other appropriate action. When the user does answer, the COMPLETE CALL subroutine 311 is entered and the flow returns to standby at operation 321 when the call is over. The COMPLETE CALL subroutine 311 is illustrated in several separate boxes in FIG. 3 for ease of description, but performs substantially similar operations in each instance.

During an incoming call when headset 102 is detected in step 316, headset 102 is enabled via a logic signal on line 132 (shown in FIG. 1) and a non-ramped ring is applied to audio line 122 by microprocessor 121 during operation 317. Microprocessor 121 monitors the microphone detect logic signal during step 318 on line 134 to detect an answer or off hook condition. As discussed before, the program simply waits for an answer or termination by the calling party. When an answer is detected in step 318, the COMPLETE CALL subroutine 311 is entered followed by a return to standby mode during operation 321 when the call is completed.

It is to be expressly understood that the claimed invention is not to be limited to the description of the preferred embodiment but encompasses other modifications and alterations within the scope and spirit of the inventive concept. For example, microprocessor 121 is preferably provided in an application specific device which may include circuitry and capability not conventionally found in a microprocessor. Also, headset jack 111 is preferably a three wire stereo jack, but other cables and jacks may be used to provide more conductors interconnecting headset 102 and wireless telephone 101.

We claim:

1. A wireless telephone for receiving digitized voice information transmitted at a radio frequency, converting the received digitized voice information into a received audio signal on a speaker audio line, converting a transmit audio signal of a users voice on a microphone audio line into digitized voice information, and transmitting the digitized voice information at the radio frequency, the wireless telephone comprising:

a microphone for receiving the user's voice and generating the transmit audio signal on a microphone output;

a switch coupled in series between the microphone output and the microphone audio line means within the wireless telephone coupled to the microphone audio line for providing a bias current to the microphone means having an input coupled to the microphone audio line and a binary output for generating a microphone current detect logic signal on the binary output when current is in the microphone audio line; and a digital logic circuit having an input coupled to the binary output, the digital logic circuit including means responsive to the binary output for generating a ringing signal on the speaker audio line when an incoming call is received, means responsive to the binary output for answering the incoming call, and means responsive to binary output for placing an outgoing call.

2. The wireless telephone of claim 1 wherein the microphone, microphone output, and switch are located in a removable headset that plugs into the wireless telephone, thereby providing a user with ability to detect incoming calls, answer incoming calls, and initiate outgoing calls by only touching the removable headset.

3. The wireless telephone of claim 1 wherein the means for providing bias current comprises a DC voltage source and a first resistor coupled between the DC voltage source and the microphone audio line.

4. The wireless telephone of claim 3 wherein the means for generating a microphone current detect logic signal further comprises:

a transistor having a first current carrying electrode coupled to the DC voltage source, a second current carrying electrode that serves as the binary output, and a control electrode coupled to the microphone audio line; and a second resistor coupled between the second current carrying electrode and ground, whereby the microphone detect logic signal is developed across the second resistor.

5. The wireless telephone of claim 4 wherein the transistor is a PNP transistor, the first current carrying electrode is an emitter of the PNP transistor, and the second current carrying electrode is a collector of the PNP transistor, and the control electrode is the base of the PNP transistor, and the means for generating a logic signal further comprises a third resistor coupled between the base of the PNP transistor and the microphone audio line.

6. A wireless telephone having a headset and a handset, said wireless telephone comprising:

a microphone in the headset a microphone audio line connecting the microphone in the headset to the handset means in the handset coupled to the microphone audio line for providing a bias current to the microphone in the headset means in the headset having an input coupled to the microphone audio line and a binary output for generating a microphone current detect logic signal on the binary output when current is in the microphone audio line; and a digital logic circuit in the headset having an input coupled to the binary output, the digital logic circuit including means responsive to the binary output for generating a ringing signal when an incoming call is received, means responsive to the binary output for answering the incoming call, and means responsive to binary output for placing an outgoing call.

7. The wireless telephone of claim 6 wherein the means for providing bias current comprises a DC voltage source and a first resistor coupled between the DC voltage source and the microphone audio line.

8. The wireless telephone of claim 7 wherein the means for generating a microphone current detect logic signal further comprises:

a transistor having a first current carrying electrode coupled to the DC voltage source, a second current carrying electrode that serves as the binary output, and a control electrode coupled to the microphone audio line; and a second resistor coupled between the second current carrying electrode and ground, whereby the microphone detect logic signal is developed across the second resistor.

9. The wireless telephone of claim 8 wherein the transistor is a PNP transistor, the first current carrying electrode is an emitter of the PNP transistor, and the second current carrying electrode is a collector of the PNP transistor, and the control electrode is the base of the PNP transistor, and the means for generating a logic signal further comprises a third resistor coupled between the base of the PNP transistor and the microphone audio line.

\* \* \* \* \*